April 17, 1928.

C. R. BIRDSEY 1,666,161

DELIVERY GUIDE

Filed Sept. 12, 1924

INVENTOR
Charles R. Birdsey.
BY Langdon Moon
ATTORNEY

April 17, 1928.

C. R. BIRDSEY

DELIVERY GUIDE

Filed Sept. 12, 1924

INVENTOR
Charles R. Birdsey.
BY Langdon Moore
ATTORNEY

Patented Apr. 17, 1928.

1,666,161

UNITED STATES PATENT OFFICE.

CHARLES R. BIRDSEY, OF HINSDALE, ILLINOIS, ASSIGNOR TO UNITED STATES GYPSUM COMPANY, OF CHICAGO, ILLINOIS, A CORPORATION OF ILLINOIS.

DELIVERY GUIDE.

Application filed September 12, 1924. Serial No. 737,237.

This invention relates to improvements in mixing belts for plastic material and more particularly to a delivery guide for the mixed plastic material as it is discharged from the mixing belt.

In plaster board manufacture it is customary to advance a bottom sheet of fibrous material over a table, deposit the plaster core material over a table, deposit the plaster core in plastic condition on said sheet, and apply the top sheet of fibrous material as the board so formed passes through pressure rollers, such as illustrated in the C. W. Utzman Patent, No. 1,330,413, granted February 10, 1920. This patent also illustrates and describes a commercial means of mixing the dry plastic composition with water on a mixing belt arranged at right angles to the direction of travel of the fibrous cover sheet upon which the mixing belt deposits the plastic mass to form the core. As the belt in this case is traveling at right angles to the travel of the bottom sheet the plastic mass discharging from the end of the belt is deposited along the longitudinal center of the bottom sheet and spreads by its own weight over the side margins but not to the edges.

To save floor space in machines of this character manufacturing two ply plastic wallboards where but one mixing belt is employed the belt has been arranged above the table in line with the direction of travel of the bottom sheet and it has been found that the plastic mass discharged from such an arrangement falls from the end of the belt over the entire width of the bottom sheet and becomes spread in a thin layer, often of less thickness than desired for the core of the board when formed, from edge to edge. When discharging at right angles to the direction of travel of the bottom sheet the deposit on the sheet is even after spreading from its own weight of greater height at the center than the thickness of the board to be formed and in passing between the pressure rollers can be regulated so that the pressure will evenly distribute the plastic core throughout the width of the board which causes the finished board to be of uniform thickness throughout.

It is an object of this invention to provide delivery guides for the discharge end of such a mixing belt that will cause the plastic mixture to be deposited in a mass in the manner of a belt discharging at right angles to the direction of travel of the bottom sheet.

With these and other objects in view reference is made to the accompanying sheets of drawing illustrating a preferred form of this invention with the understanding that minor detail changes may be made without departing from the scope thereof.

Figure 1:
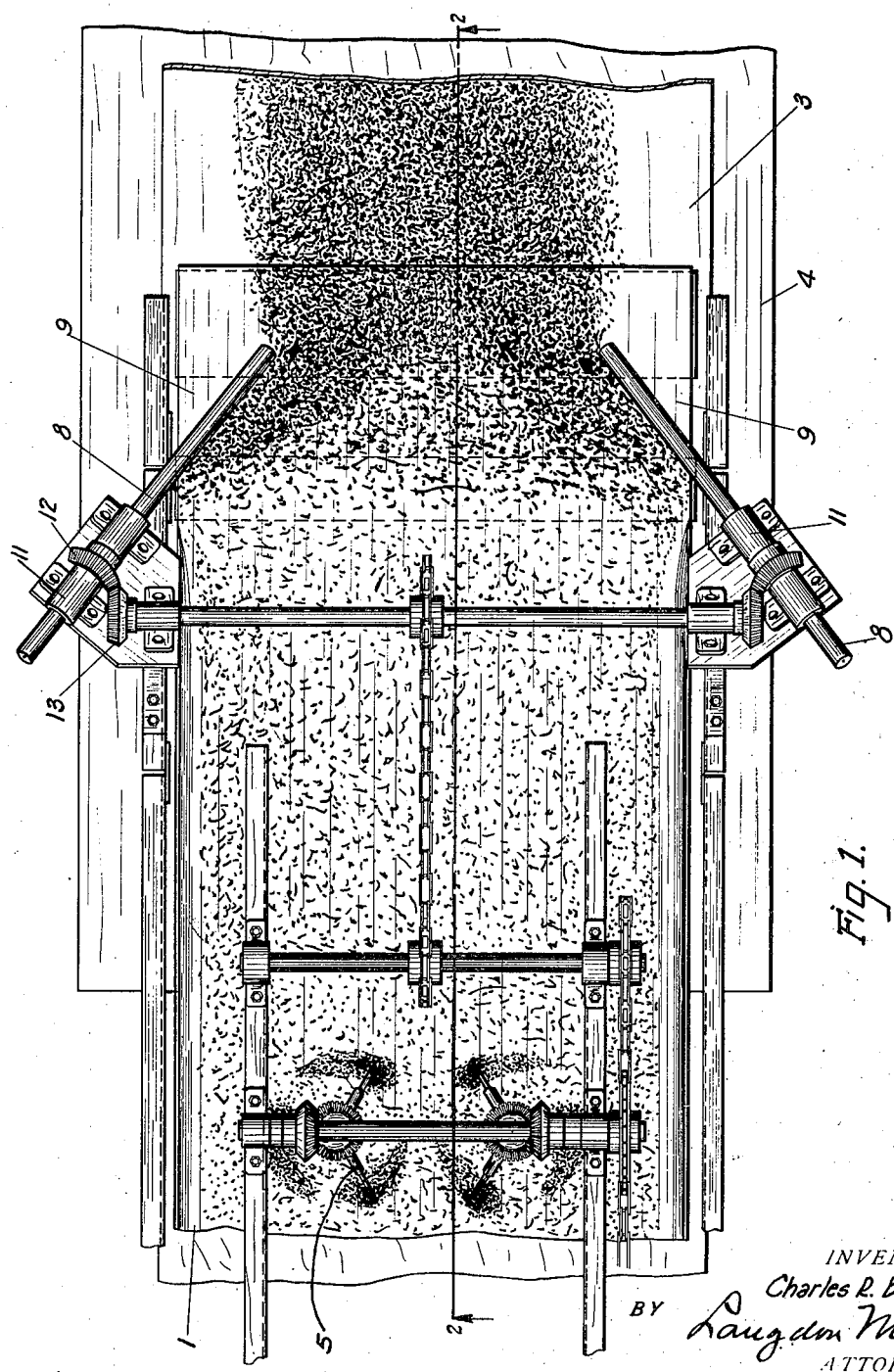
Figure 1 is a fragmentary top plan view of the discharge end of a mixing belt which travels in the same direction as the bottom sheet and to which this invention has been applied.
Figure 2:
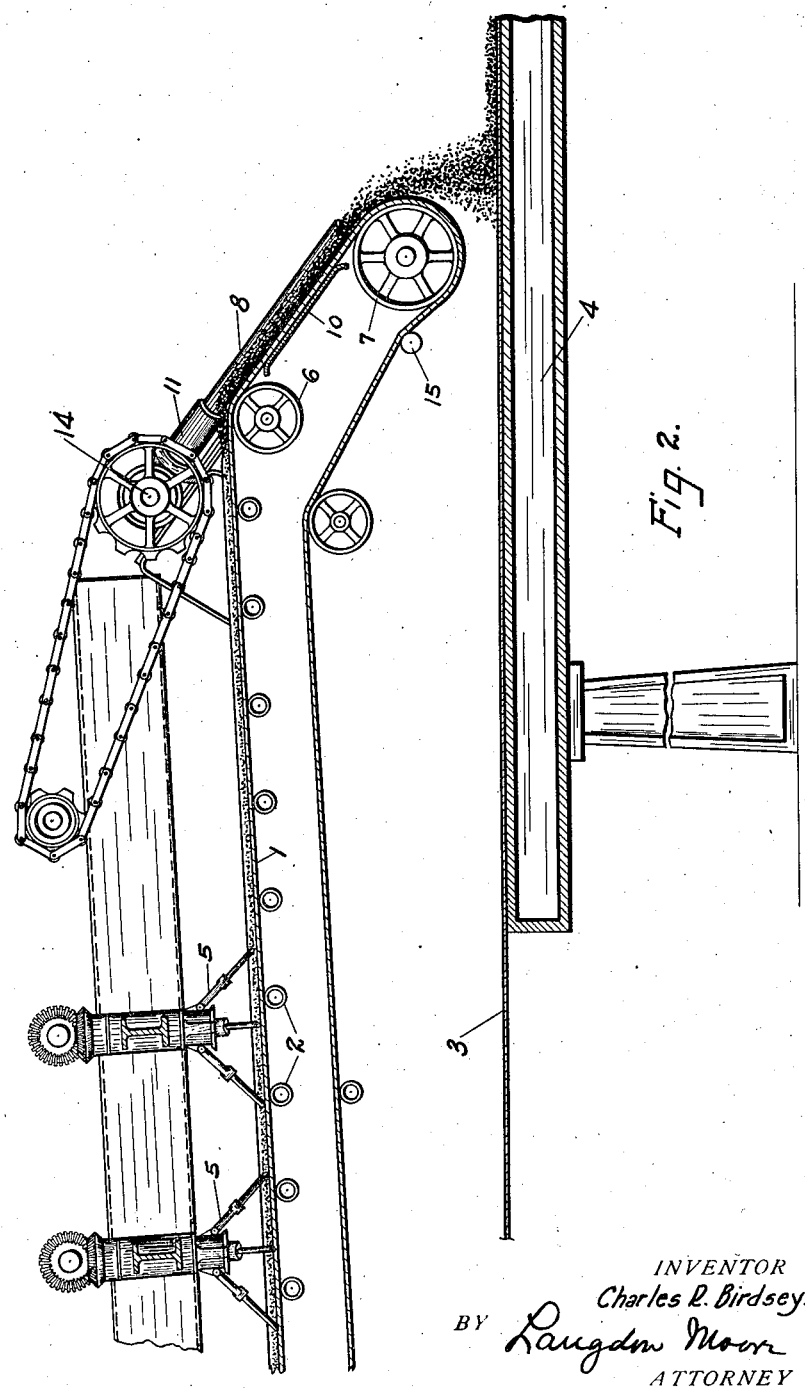
Figure 2 is a view in vertical section taken on the line 2—2, Figure 1.

In carrying out this invention the mixing belt 1 is an endless belt traveling over a plurality of guide rollers 2 and is arranged to travel in the same direction as the bottom sheet 3 of the plaster wallboard as it moves over the table 4. The plastic material in dry powdered form and water are deposited upon the belt in the customary manner and are mixed by a plurality of rotating stirring devices 5, of which the two nearest the discharge end of the belt are shown. The side margins of the belt are preferably dished upward at each longitudinal edge to retain the mixture therein which margins are flattened out as they pass over the end pulley of the belt. In accordance with this invention the discharge end of the belt is deflected from its horizontal path to incline downward by the guide roller 6 and the end pulley 7 arranged therebeyond and below the guide roller.

Delivery guides for the plastic mass in the form of rotating members 8 are arranged on each side of the belt adapted to engage the inclined portion 9 as it departs from the horizontal, which portion is maintained in contact with the guides 8 by a plate 10 over which the belt passes between the guide roller 6 and end pulley 7. The guide members 8 are mounted in bearings 11 on the belt supporting frame, which may be angularly adjustable in relation to the direction of travel of the belt if desired, and the members 8 are preferably longitudinally adjustable in their bearings to increase or decrease the width of the discharge between them. Rotation is imparted in a direction opposite the direction of travel of the belt by any preferred means, such as the gears 12 thereon meshing with gears 13 on the driving shaft 14 driven by a chain connection from the rotating stirring mechanism, as shown.

Since it is necessary to remove the mixture adhering to the belt before it sets, rotation of the delivery guides in a direction opposite the travel of the belt not only directs the plastic mass more towards the center of the belt but at the same time acts as a scraper to clean the margins of the belt passing thereunder. The main body of the belt is scraped in the same manner on its rearward travel after passing over the end pulley by an oppositely rotating scraper rod 15.

By these delivery guides the plastic mixture is guided towards the center of the belt just before it is deposited upon the bottom sheet and the devices may be so manipulated as to produce the desired mass of the mixture continuously deposited along the central portion of the bottom sheet.

What I claim is:

1. In a device of the character described, an endless travelling mixing and conveying belt, an end pulley over which said belt passes and rotating directing delivery guides in marginal contact with the upper face of said belt travelling thereunder, and marginally located adjacent the discharging end of the mixing and conveying belt.

2. In a device of the character described, an endless belt for carrying a plastic mixture including an end pulley, means forming an angularly inclined portion of the belt and longitudinally thereof adjacent the end pulley and delivery guides arranged over said inclined portion.

3. In a device for continuously discharging plastic material including an endless conveyor belt, means for inclining a portion of the belt adjacent its discharge end, delivery guides on each side of the inclined portion and under which the belt travels, and means arranged on the under side of the belt maintaining the inclined portion in contact with said guides.

4. In a device of the character described, an endless belt for conveying a plastic mixture and rotating delivery guides for said mixture arranged adjacent the delivery end and in scraping contact with the upper margins of said belt for agglomerating the mass of plastic material at the point of discharge.

5. In a device for continuously discharging plastic cementitious material, an endless belt for carrying a plastic mixture, and rotating delivery guides adjacent the discharge end extending inwardly over the edges thereof for directing the plastic material towards the center of the belt and for contacting with the edges to keep them free from accumulation of hardening cementitious material.

6. In a device of the character described, an endless belt conveyor, means for longitudinally inclining an upper portion of the belt adjacent its discharge end, and oppositely rotating delivery guides contacting with the inclined portion of the belt to direct the material thereon towards the center and scrape the margins of the belt clean.

7. In a device for continuously discharging plastic cementituous material including an endless belt conveyor, delivery guides contacting with the upper surface of the belt near its discharge end, and means under the belt at the discharge end for maintaining the belt in contact with the delivery guides.

CHARLES R. BIRDSEY.